(12) United States Patent
Chen et al.

(10) Patent No.: US 11,663,026 B2
(45) Date of Patent: May 30, 2023

(54) ALLOCATION OF ACCELERATOR RESOURCES BASED ON JOB TYPE

(71) Applicant: EMC IP Holding Company LLC, Hopkinton, MA (US)

(72) Inventors: Jet Chen, Beijing (CN); Bing Liu, Tianjin (CN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 364 days.

(21) Appl. No.: 16/916,562

(22) Filed: Jun. 30, 2020

(65) Prior Publication Data

US 2021/0373926 A1 Dec. 2, 2021

(30) Foreign Application Priority Data

May 28, 2020 (CN) .......................... 202010470741.1

(51) Int. Cl.
| | |
|---|---|
| G06F 9/455 | (2018.01) |
| G06F 9/48 | (2006.01) |
| G06F 9/50 | (2006.01) |
| G06F 11/34 | (2006.01) |
| G06F 11/14 | (2006.01) |
| G06F 12/02 | (2006.01) |

(52) U.S. Cl.
CPC ........ *G06F 9/45558* (2013.01); *G06F 9/4856* (2013.01); *G06F 9/5011* (2013.01); *G06F 9/5027* (2013.01); *G06F 11/1451* (2013.01); *G06F 11/1464* (2013.01); *G06F 11/1469* (2013.01); *G06F 11/3466* (2013.01); *G06F 12/0253* (2013.01); *G06F 2009/45583* (2013.01); *G06F 2009/45591* (2013.01); *G06F 2209/5011* (2013.01)

(58) Field of Classification Search
CPC .. G06F 9/45558; G06F 9/4856; G06F 9/5011; G06F 9/5027; G06F 11/3466
See application file for complete search history.

(56) References Cited

U.S. PATENT DOCUMENTS

| | | | | |
|---|---|---|---|---|
| 6,263,359 | B1 * | 7/2001 | Fong ..................... | G06F 9/4881 718/103 |
| 6,711,616 | B1 * | 3/2004 | Stamm ................... | H04L 67/01 718/100 |
| 7,958,511 | B1 * | 6/2011 | Pomerantsev ........ | G06F 9/5027 718/104 |
| 10,002,024 | B2 * | 6/2018 | Di Balsamo .......... | G06F 9/5005 |

(Continued)

*Primary Examiner* — Benjamin C Wu
(74) *Attorney, Agent, or Firm* — Womble Bond Dickinson (US) LLP

(57) ABSTRACT

A resource use method, an electronic device, and a computer program product are provided in embodiments of the present disclosure. The method includes determining a plurality of jobs requesting to use accelerator resources to accelerate data processing. The plurality of jobs are initiated by at least one virtual machine. The method further includes allocating available accelerator resources to the plurality of jobs based on job types of the plurality of jobs. The method further includes causing the plurality of jobs to be executed using the allocated accelerator resources. With the embodiments of the present disclosure, accelerator resources can be dynamically allocated, thereby improving the overall performance of a system.

15 Claims, 7 Drawing Sheets

(56) References Cited

U.S. PATENT DOCUMENTS

| | | | | |
|---|---|---|---|---|
| 2014/0047341 | A1* | 2/2014 | Breternitz | G06F 16/23 |
| | | | | 715/735 |
| 2014/0173616 | A1* | 6/2014 | Bird | G06F 9/5083 |
| | | | | 718/104 |
| 2017/0123873 | A1* | 5/2017 | Baddourah | G06F 11/0751 |
| 2018/0032375 | A1* | 2/2018 | Tan | G06F 9/5055 |
| 2018/0150334 | A1* | 5/2018 | Bernat | H04L 43/04 |
| 2018/0152201 | A1* | 5/2018 | Gopal | G06T 1/20 |
| 2019/0354398 | A1* | 11/2019 | Aggarwal | H04L 43/0817 |
| 2020/0097348 | A1* | 3/2020 | Mahindru | G06F 11/008 |
| 2020/0174838 | A1* | 6/2020 | Li | G06F 9/505 |
| 2020/0409748 | A1* | 12/2020 | Bernat | G06F 9/4856 |
| 2021/0044503 | A1* | 2/2021 | Zhang | H04L 41/5025 |
| 2022/0117046 | A1* | 4/2022 | Bequet | G06F 9/485 |
| 2022/0179709 | A1* | 6/2022 | Yang | G06F 9/5038 |

* cited by examiner

ALLOCATION OF ACCELERATOR RESOURCES BASED ON JOB TYPE

CROSS-REFERENCE TO RELATED APPLICATION

This patent application claims priority, under 35 U.S.C. § 119, of Chinese Patent Application No. 202010470741.1, filed May 28, 2020, which is incorporated by reference in its entirety.

TECHNICAL FIELD

Embodiments of the present disclosure relate to the technical field of computers, and in particular, to a resource use method, an electronic device, and a computer program product.

BACKGROUND

Accelerator resources refer to some processing resources with an acceleration function, such as a co-processor, which can assist a central processing unit (CPU) to perform some acceleration tasks. Co-processor is a chip that can alleviate specific processing tasks of a system CPU. For example, a math co-processor may perform digital processing, and a graphics co-processor (GPU) may handle video rendering. GPU is a core processor dedicated to graphics or images, and its main task is to speed up graphics processing.

Quick assist technology (QAT) card is also a co-processor, which may be used to accelerate computationally intensive tasks, such as compression and encryption. By adding the QAT card to a system, the operation of applications can be accelerated, and the performance and efficiency of the system can be improved. The functions provided by the QAT card may include symmetric encryption, identity verification, asymmetric encryption, digital signature, public key encryption, lossless data compression, etc.

SUMMARY OF THE INVENTION

The embodiments of the present disclosure provide a resource use solution.

In a first aspect of the present disclosure, a resource use method is provided. The method includes: determining a plurality of jobs requesting to use accelerator resources to accelerate data processing, the plurality of jobs being initiated by at least one virtual machine; allocating available accelerator resources to the plurality of jobs based on job types of the plurality of jobs; and causing the plurality of jobs to be executed using the allocated accelerator resources.

In a second aspect of the present disclosure, an electronic device is provided. The electronic device includes a processor and a memory that is coupled to the processor and has instructions stored therein. The instructions, when executed by the processor, cause the device to execute actions. The actions include: determining a plurality of jobs requesting to use accelerator resources to accelerate data processing, the plurality of jobs being initiated by at least one virtual machine; allocating available accelerator resources to the plurality of jobs based on job types of the plurality of jobs; and causing the plurality of jobs to be executed using the allocated accelerator resources.

In a third aspect of the present disclosure, a computer program product is provided. The computer program product is tangibly stored on a computer-readable medium and includes machine-executable instructions. The machine-executable instructions, when executed, cause a machine to execute the method according to the first aspect.

The summary part is provided to introduce the selection of concepts in a simplified form, which will be further described in the Detailed Description below. The summary part is neither intended to identify key features or main features of the present disclosure, nor intended to limit the scope of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same components. In the accompanying drawings.

DETAILED DESCRIPTION

The principles of the present disclosure will be described below with reference to some example embodiments shown in the accompanying drawings. Although preferred embodiments of the present disclosure are shown in the accompanying drawings, it should be understood that these embodiments are described merely to enable those skilled in the art to better understand and then implement the present disclosure, and do not limit the scope of the present disclosure in any way.

The term "including" and variants thereof used herein indicate open-ended inclusion, i.e., "including, but not limited to." Unless specifically stated, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As mentioned above, accelerator technologies such as the QAT technology have been widely used in various systems, such as a storage system with deduplication applications. Such systems are usually built based on virtualization technologies. So, how to deploy and utilize accelerator resources in a virtualized environment becomes an important issue.

Figure 1:
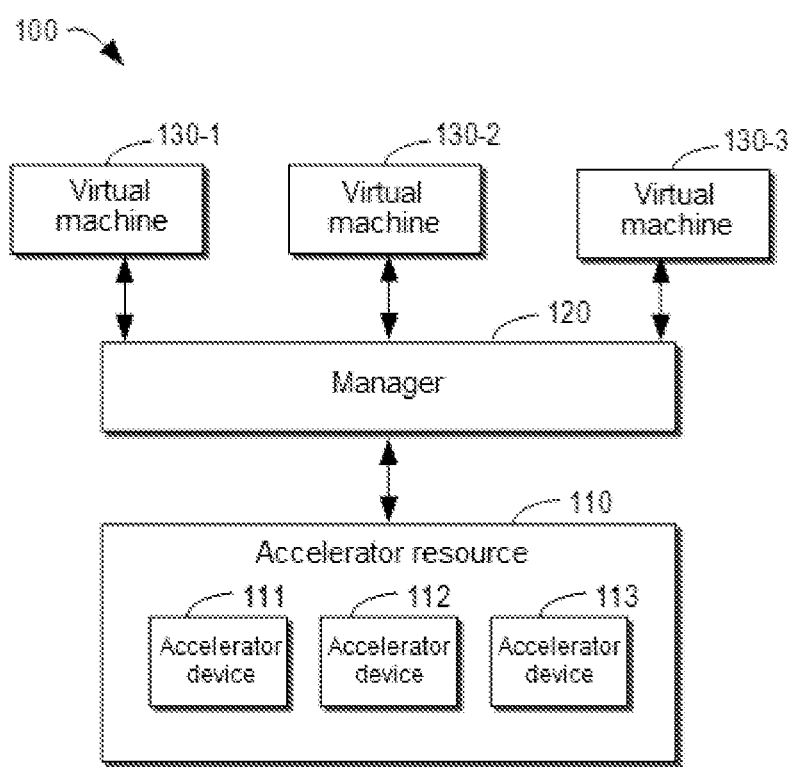
FIG. 1 illustrates a schematic diagram of a part of a storage system in which the embodiments of the present disclosure may be implemented.

FIG. 1 illustrates a schematic diagram of a part of storage system 100 in which the embodiments of the present disclosure may be implemented. As shown in FIG. 1, storage system 100 includes accelerator resource 110, manager 120, and one or more virtual machines. FIG. 1 shows a plurality of virtual machines 130-1, 130-2, and 130-3. It should be understood that storage system 100 may further include one or more other components not shown.

Accelerator resource 110 may include one or more accelerator devices, such as accelerator devices 111-113 shown in FIG. 1. Accelerator resource 110 may act as a co-processor of storage system 100 so as to alleviate some processing tasks of a general-purpose processor (not shown). Accelerator resource 110 can realize accelerated operations for certain specific functions and operations, and can achieve higher execution efficiency than the general-purpose processor does. In some embodiments, accelerator resource 110 may be one or more QAT cards, which may accelerate the encryption and/or decryption of data, and may also accelerate the compression and/or decompression of data. It should be understood that although QAT cards are used as an example of the accelerator resource in some embodiments of the present disclosure, the accelerator resource may also be other hardware processing devices with an acceleration function for specific tasks (such as encryption, decryption, compression, and matrix operations).

As shown in FIG. 1, storage system 100 implements a virtualized environment and includes virtual machines 130-1, 130-2, and 130-3. For ease of description, virtual machines 130-1, 130-2, and 130-3 may also be collectively referred to as virtual machine 130 below. Virtual machine 130 may run applications to perform various tasks of storage system 100.

Virtual machine 130 may initiate various types of jobs. Different types of jobs have different importance. These different types of jobs may request to use accelerator resource 110.

Manager 120 may be implemented by a software module to support the use of accelerator resource 110 in the virtualized environment. Specifically, manager 120 may manage the allocation of accelerator resource 110 to various jobs.

In conventional solutions, the allocation of accelerator resources lacks global coordination and processing based on job types. When accelerator resources are scarce, jobs of high importance may be affected. For example, some virtual machines are utilizing very limited accelerator resources to accelerate jobs of high importance, while other virtual machines are utilizing abundant accelerator resources to accelerate jobs of low importance.

On the other hand, in conventional solutions, accelerator resources are bound to virtual machines. A job initiated by a virtual machine can only utilize accelerator resources pre-allocated to the virtual machine, regardless of whether other accelerator resources are available in the system. The binding of accelerator resources to virtual machines is usually achieved through the direct connection technology or SR-IOV. In the direct connection technology, a virtual machine may be directly bound to one or more physical accelerator devices.

Figure 2:
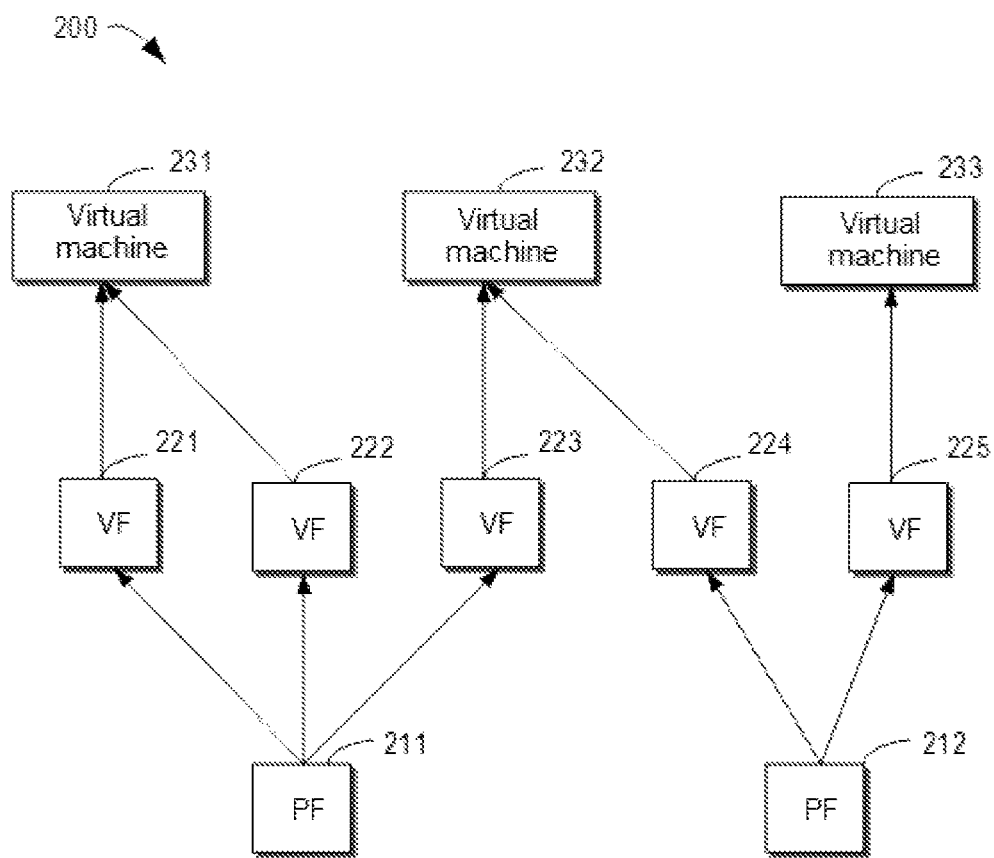
FIG. 2 illustrates a schematic block diagram of a conventional solution in which accelerator resources are utilized.

SR-IOV is a commonly used virtualization support technology. The SR-IOV-based binding will be described below with reference to FIG. 2. FIG. 2 illustrates schematic block diagram 200 of a conventional solution in which accelerator resources are utilized. Physical functions PF 211 and PF 212 shown in FIG. 2 may be regarded as physical accelerator devices, such as QAT cards. PF 211 may be virtualized as virtual functions VF 221-223, and PF 212 may be virtualized as virtual functions VF 224 and 225.

VF 221 and VF 222 are bound to virtual machine 231, VF 223 and VF 224 are bound to virtual machine 232, and VF 225 is bound to virtual machine 233. It can be seen that, in the conventional solution, the virtual machine regards VF as a physical accelerator resource. In addition, the binding between virtual machines and VFs is static. Once the binding is complete, it is difficult to modify the configuration of the binding at runtime.

Therefore, the conventional solution has several disadvantages. First, the conventional solution lacks quality of service (QoS) support for individual virtual machines. Regarding VF as a physical device leaves the QoS function to virtual machines. The demands of jobs of different importance for accelerator resources are balanced by the virtual machines. This needs to rely on an operating system's provider or an application's provider to implement in the operating system or the application.

Second, the conventional solution lacks the QoS support across virtual machines. In a storage system with a plurality of virtual machines running for designated clients respectively, different jobs from different virtual machines also need to be balanced according to their importance. However, SR-IOV does not provide any information about jobs to the manager.

In addition, the conventional solution lacks management from a global perspective, but leaves a device management job to virtual machines. In this way, if an accelerator device fails, even if there are other available accelerator devices, a virtual machine using the accelerator device will be severely affected. As shown in FIG. 1, once PF 211 fails, a job initiated by virtual machine 231 will not be able to utilize accelerator resources. Similarly, once PF 212 fails, a job initiated by virtual machine 233 will not be able to utilize accelerator resources.

To this end, the present disclosure provides a resource use solution to at least eliminate one or more of the above defects. In the solution of the present disclosure, if a plurality of jobs requesting to use accelerator resources are initiated by at least one virtual machine, available accelerator resources are allocated to the plurality of jobs based on job types of the plurality of jobs, regardless of which virtual machine initiates the jobs.

In the resource use solution proposed by the present disclosure, accelerator resources are managed and used from a global perspective and based on job types. In this way, accelerator resources may be dynamically allocated based on workload, thereby improving the overall performance of a system.

Basic principles and several example implementations of the present disclosure are illustrated below with reference to FIG. 3 to FIG. 7. It should be understood that these example embodiments are provided only to enable those skilled in the art to better understand and then implement the embodiments of the present disclosure, and not to limit the scope of the present disclosure in any way.

Figure 3:
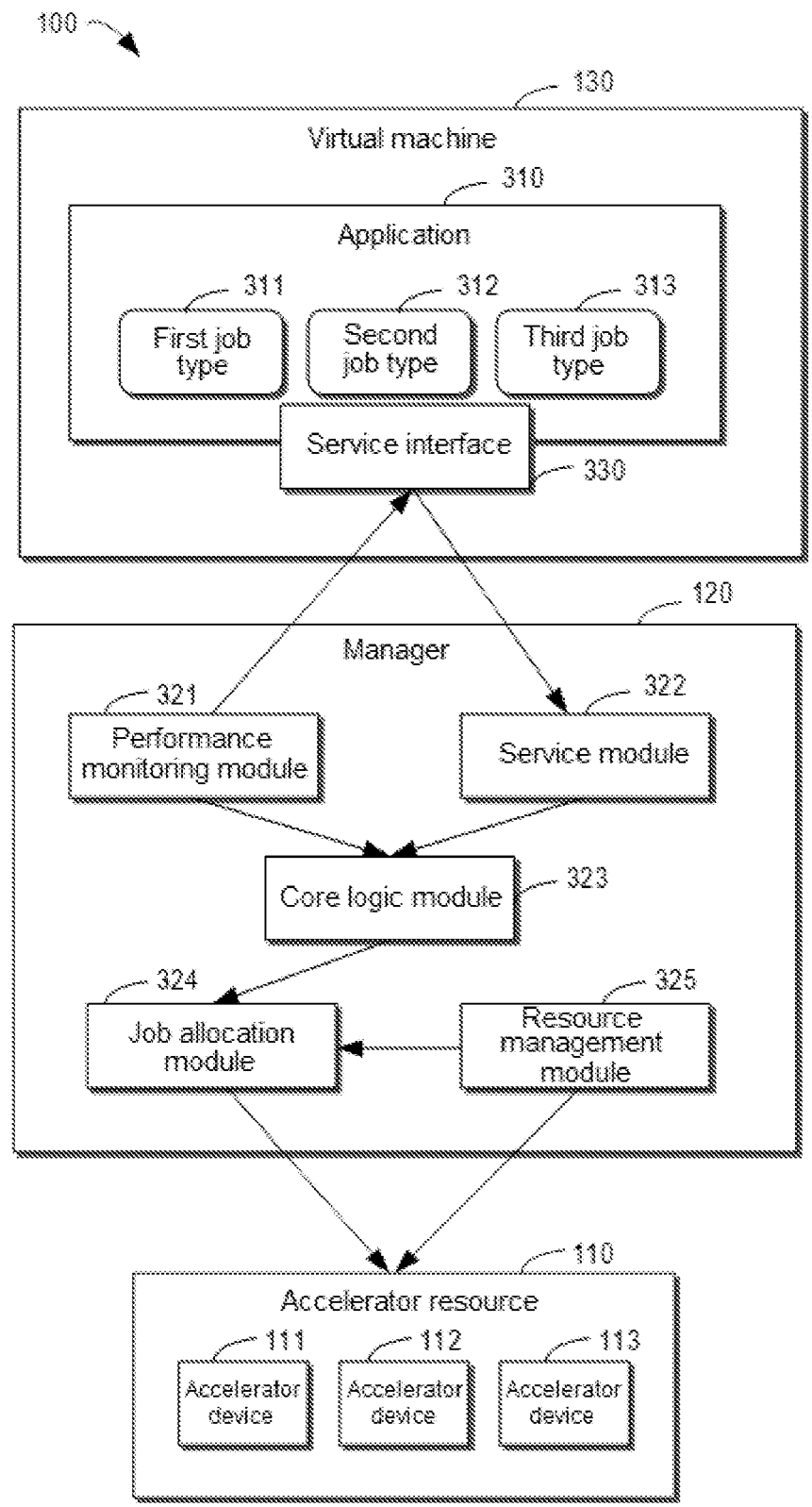
FIG. 3 illustrates a schematic block diagram of a storage system according to some embodiments of the present disclosure.

FIG. 3 illustrates a schematic block diagram of a part of storage system 100 according to some embodiments of the present disclosure. As shown in FIG. 3, virtual machine 130 may represent any one of virtual machines 130-1, 130-2, and 130-3 shown in FIG. 1. Virtual machine 130 may run or be arranged with application 310, for example, a deduplication application. Application 310 may initiate a plurality of jobs. The plurality of jobs may have different types, for example, first job type 311, second job type 312, and third job type 313 shown in FIG. 3.

As an example, first job type 311 may be a job type for data recovery, and a job of this job type may be referred to herein as a recovery job. The recovery job may refer to a job of retrieving a copy of a user system from storage system 100 for recovery.

Second job type 312 may be a job type for data backup, and a job of this job type may be referred to herein as a backup job. The backup job may refer to a job of transmitting a copy of the user system that has been generated to storage system 100 so as to perform backup.

Third job type 313 may be a job type for garbage collection, and a job of this job type may be referred to herein as a garbage collection job. The garbage collection job may refer to a job of collecting a storage space in storage system 100 that is no longer occupied.

It can be understood that the three job types shown in FIG. 3 are only schematic, and are not intended to limit the scope of the present disclosure. A job initiated by application 310 may also have one or more other job types, for example, a job type for data copy. A job of this job type may be referred to herein as a copy job. The copy job may refer to a job of copying data in storage system 100 for data security or other reasons. For example, migrating data to a cloud may be a copy job.

A job initiated at virtual machine 130 may request to use accelerator resource 110 to accelerate data processing. To this end, a request of using accelerator resource 110 and for the job may be generated at virtual machine 130, which may also be referred to as a resource use request below. Service interface 330 disposed at virtual machine 130 may collect the resource use request at virtual machine 130 and add information indicating a job type of the job to the resource use request. For example, service interface 330 may add a label indicating the job type. Service interface 330 may send the collected one or more resource use requests to service module 322 in manager 120.

Service module 322 provides a unified interface for virtual machines. With service module 322, virtual machine 130 may use accelerator resource 110 as a service, without managing virtualized resources or devices itself. The introduction of service module 322 may break the binding between virtual machines and accelerator resources, so that accelerator resource events such as failures are transparent to virtual machine 130. This helps to simplify the design of application 310.

Core logic module 323 receives, from service module 322, resource use requests from all virtual machines 130. Core logic module 323 may determine an allocation solution of accelerator resource 110 based on job types of the jobs requesting to use the accelerator resources. The specific operation of core logic module 323 will be described below with reference to FIG. 4.

Job allocation module 324 receives the allocation solution from core logic module 323 and distributes the resource use requests to available accelerator resources based on the allocation solution, so that corresponding jobs are executed using allocated accelerator resources.

Resource management module 325 manages accelerator resources 110 in storage system 100 from a global perspective. When a hardware failure occurs, resource management module 325 may attempt to recover the affected accelerator device. Resource management module 325 may determine available accelerator resources, and indicate to job allocation module 324 or notify job allocation module 324 of the available accelerator resources.

Performance monitoring module 321 may monitor the execution of jobs of one or more job types. If the execution performance of a job of a certain job type does not meet the performance requirements, performance monitoring module 321 may cause the available accelerator resources to be reallocated.

Figure 4:
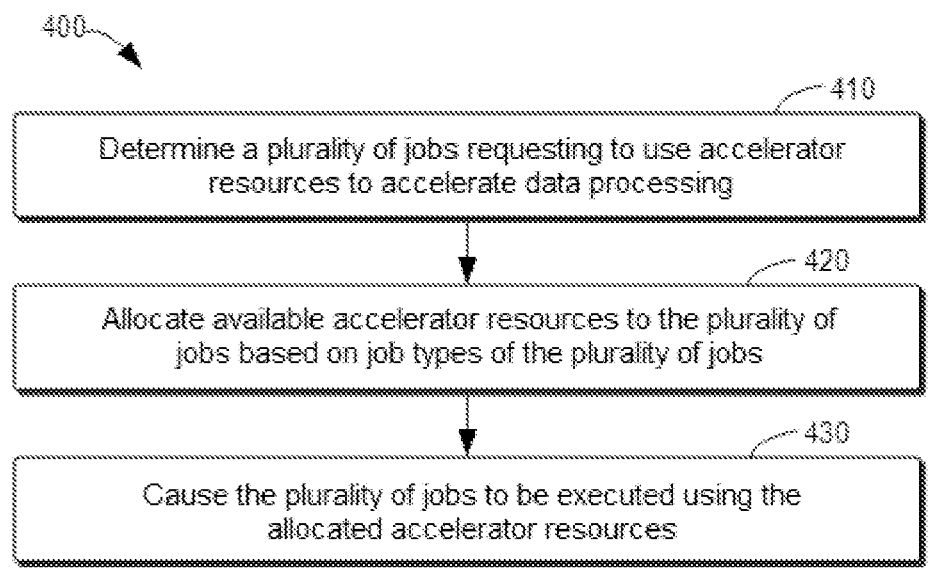
FIG. 4 shows a flowchart of a resource use method according to some embodiments of the present disclosure.

More details of example embodiments of the present disclosure will be described below with reference to FIG. 4. FIG. 4 shows a flowchart of resource utilization method 400 according to some embodiments of the present disclosure. It should be understood that method 400 may further include additional actions that are not shown and/or may omit actions that are shown. The scope of the present disclosure is not limited in this regard. Method 400 is described in detail below with reference to FIG. 3.

At block 410, a plurality of jobs requesting to use accelerator resource 110 to accelerate data processing are determined. The plurality of jobs are initiated by at least one virtual machine 130. For example, the plurality of jobs may be initiated by one or more of virtual machines 130-1, 130-2, and 130-3, and request to use accelerator resource 110 to accelerate data processing.

In some embodiments, if a plurality of requests for a plurality of jobs are generated at the at least one virtual machine 130, the plurality of jobs may be determined based on the plurality of requests. Each request indicates a job type of a corresponding job among the plurality of jobs and includes data to be processed.

For example, if a resource use request for a job is generated at virtual machine 130, service interface 330 may add information about a job type to the resource use request and send the resource use request to service module 322. Service module 322 may receive resource use requests sent by service interfaces 330 in a plurality of virtual machines 130, and determine a plurality of jobs requesting to use accelerator resource 110 from the received resource use requests.

At block 420, available accelerator resources are allocated to the plurality of jobs based on job types of the plurality of jobs. For example, service module 322 may send the resource use requests from the plurality of virtual machines 130 to core logic module 323. These requests may indicate job types of jobs requesting to use accelerator resource 110, and may additionally include data to be processed. Core logic module 323 may determine how to allocate available accelerator resources among the plurality of jobs based on the job types of the plurality of jobs. In other words, core logic module 323 may determine a resource allocation solution. For example, core logic module 323 may determine a proportion of the available accelerator resources allocated to each job type. Core logic module 323 may send the determined allocation solution to job allocation module 324.

Resource management module 325 may determine currently available accelerator resources. In some embodiments, resource management module 325 may select, from a resource pool including a plurality of accelerator devices, failure-free accelerator devices as available accelerator resources. For example, if accelerator device 113 fails and accelerator devices 111 and 112 do not fail, resource management module 325 may determine accelerator devices 111 and 112 as available accelerator resources.

In some embodiments, the determination of available accelerator resources may be subdivided. As an example, if accelerator devices 111, 112, and 113 include a plurality of accelerator channels, resource management module 325 may determine the available accelerator resources based on available accelerator channels.

Job allocation module 324 may receive information about the available accelerator resources from resource management module 325. Next, job allocation module 324 may allocate the available accelerator resources to the plurality of jobs according to the resource allocation solution received from core logic module 323.

In some embodiments, if it is determined that the plurality of jobs have the same job type, the available accelerator resources may be allocated to the plurality of jobs. For example, core logic module 323 determines that the plurality of jobs requesting to use accelerator resource 110 all have a first job type. Core logic module 323 may instruct job allocation module 324 to evenly allocate all currently available accelerator resources to the plurality of jobs of the first job type. For example, job allocation module 324 may evenly allocate the available accelerator resources to the plurality of jobs.

In some embodiments, if the plurality of jobs have a plurality of job types, corresponding proportions of the available accelerator resources allocated to the plurality of job types may be determined. Then, the available accelerator resources may be allocated to the plurality of jobs according to the determined proportions. For example, core logic module 323 may determine corresponding proportions of the available accelerator resources allocated to the plurality of job types as an allocation solution, and then send the determined proportions to job allocation module 324. Job allocation module 324 may allocate the available accelerator resources to the plurality of jobs according to the determined proportions.

In some embodiments, in order to determine corresponding proportions, core logic module 323 may determine a weight of each job type and the number of jobs of each job type among the plurality of jobs. Then, core logic module 323 may determine a proportion of the available accelerator resources allocated to each job type based on the weight and the number. The weight of each job type may be predetermined or may be configured by a user of storage system 100.

Figure 5:
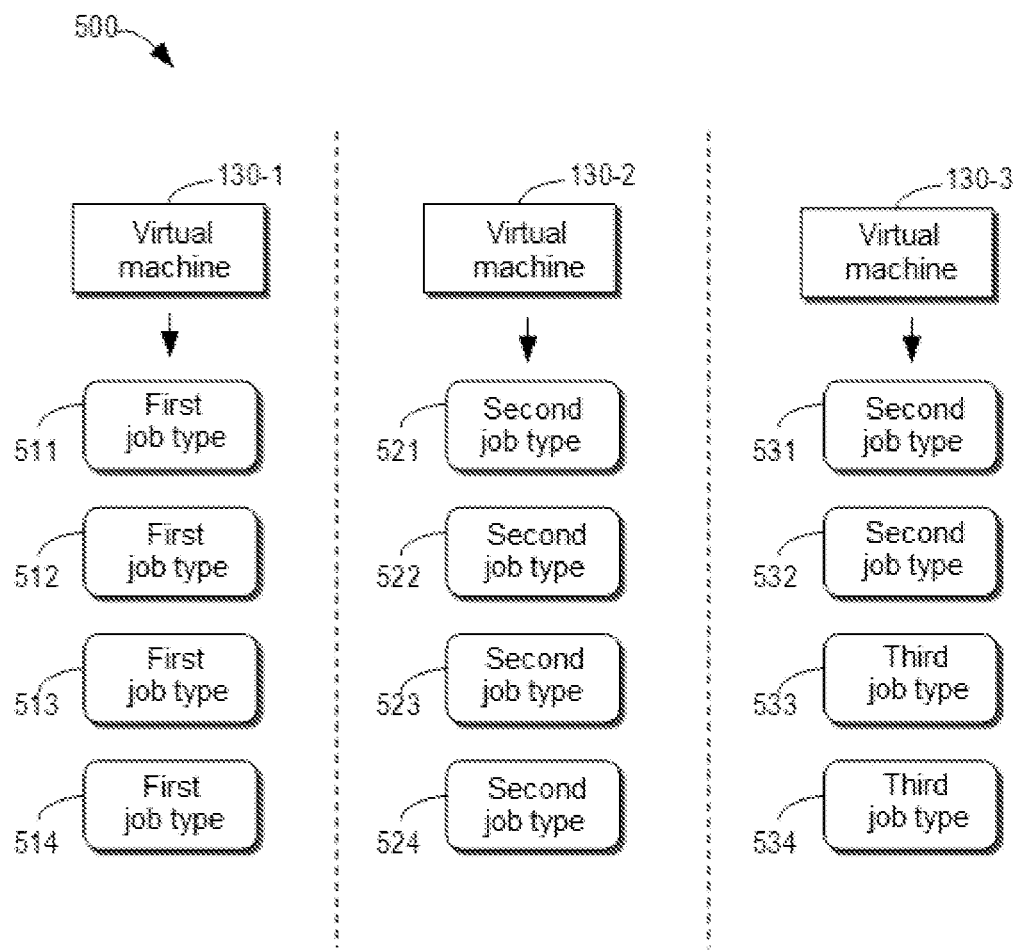
FIG. 5 illustrates a schematic diagram of jobs initiated by a plurality of virtual machines according to some embodiments of the present disclosure.

An example is described below with reference to FIG. 5 and FIG. 6. FIG. 5 illustrates schematic diagram 500 of jobs initiated by a plurality of virtual machines according to some embodiments of the present disclosure. As shown in FIG. 5, virtual machines 130-1, 130-2, and 130-3 respectively submit a plurality of resource use requests of requesting to use accelerator resource 110 to manager 120. Jobs 511-514 of a first job type initiated by virtual machine 130-1 request to use accelerator resource 110, jobs 521-524 of a second job type initiated by virtual machine 130-2 request to use accelerator resource 110, and jobs 531-532 of the second job type and jobs 533-534 of a third job type that are all initiated by virtual machine 130-3 request to use accelerator resource 110.

Core logic module 323 may determine a weight of each job type. It is assumed here that the first job type is a job type of high importance and has a first weight (for example, 5). The second job type has importance lower than that of the first job type and has a second weight (for example, 4). The third job type is a job type of low importance and has a third weight (for example, 3). As an example, jobs 511-514 of the first job type may be recovery jobs, jobs 521-524 and 531-532 of the second job type may be backup jobs, and jobs 533-534 of the third job type may be garbage collection jobs.

Core logic module 323 may further determine the number of jobs of each job type. For example, in the example of FIG. 5, the number of jobs of the first job type is 4, the number of jobs of the second job type is 6, and the number of jobs of the third job type is 2.

Next, core logic module 323 may determine a proportion of the available accelerator resources allocated to each job type based on the weights and the numbers. FIG. 6 illustrates schematic diagram 600 of allocating accelerator resources according to some embodiments of the present disclosure. In the example of FIG. 6, it is assumed that the weights of the first job type, the second job type, and the third job type are 5, 4, and 3, respectively. As shown in FIG. 6, 40% of the available accelerator resources will be allocated to jobs 511-514 of the first job type, 48% of the available accelerator resources will be allocated to jobs 521-524 and 531-532 of the second job type, and 12% of the available accelerator resources will be allocated to jobs 533-534 of the third job type.

Job allocation module 324 may allocate the available accelerator resources according to the determined proportions. The available accelerator resources allocated to a certain job type may be evenly allocated among a plurality of jobs of the job type. For example, 40% of the available accelerator resources may be evenly allocated among jobs 511-514. Job allocation module 324 may also process available accelerator resources allocated to a certain job type in other suitable ways.

Figure 6:
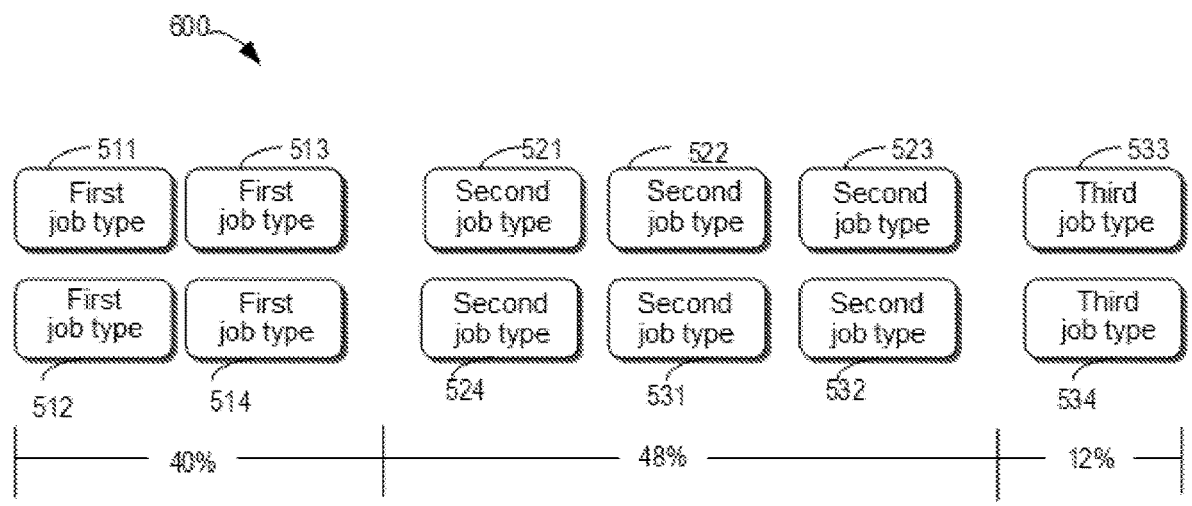
FIG. 6 illustrates a schematic diagram of allocating accelerator resources according to some embodiments of the present disclosure.

It should be understood that the values of weights, the number of jobs, and the numbers and proportions of job types described with reference to FIGS. 5 and 6 are for illustration, and are not intended to limit the scope of the present disclosure.

As mentioned above with reference to FIG. 3, in some embodiments, jobs initiated by virtual machine 130 may include a recovery job, a backup job, a garbage collection job, a copy job, and the like. It can be understood that the importance of the recovery job and the backup job is higher than that of the garbage collection job and the copy job. Therefore, the weight of any one of the recovery job and the backup job may be greater than the weight of any one of the garbage collection job and the copy job. In particular, the weight of the recovery job may also be greater than the weight of the backup job.

Still referring to FIG. 4, at block 430, the plurality of jobs are caused to be executed using the allocated accelerator resources. For example, job allocation module 324 may distribute a resource use request for a job to a corresponding accelerator device, such as accelerator device 111.

There may be a service level agreement between storage system 100 and a user. The service level agreement may include performance requirements for different jobs. In some embodiments, performance monitoring module 321 may monitor the execution performance of jobs of at least one job type. For example, the importance of recovery and backup jobs is high, so the execution performance of recovery and backup jobs may be monitored. The monitored execution performance may be any parameter that reflects an execution status of a job. As an example, the monitored execution performance may be data throughput, a latency of data processing, and the like of a job.

If the execution performance of jobs of a certain job type does not meet the performance requirements specified in the service level agreement, the weight of the job type may be increased. For example, performance monitoring module 321 may increase the weight of the job type, and send the increased weight to core logic module 323. Alternatively, performance monitoring module 321 may instruct or cause, in any suitable manner, core logic module 323 to increase the weight of the job type. Core logic module 323 may further update the proportion of the available accelerator resources allocated to each job type based on the increased weight and the number of jobs of each job type.

Still referring to the example in FIG. 6, it is assumed that performance monitoring module 321 monitors that jobs of the first job type is difficult to meet the performance requirements specified in the service level agreement. The weight of the first job type may be increased from 5 to, for example, 6. Then, the proportion of the available accelerator resources allocated to the first job type is updated based on the increased weight. For example, 44.4% of the available accelerator resources may be allocated to jobs 511-514 of the first job type. Job allocation module 324 may reallocate the available accelerator resources according to the updated proportions.

Example embodiments of the present disclosure are described above in the context of a storage system. However, it should be understood that the resource use solution proposed by the present disclosure may be applied to any suitable system or device, such as a communication system, an email system, and a multimedia service system.

It can be seen from the above-described example embodiments that the resource use solution according to some embodiments of the present disclosure has the following improvements. First, the resource use solution according to an embodiment of the present disclosure shares accelerator resources from a global perspective in a virtualized environment. Unlike the conventional solution in which VF is bound to a virtual machine, in the resource use solution according to an embodiment of the present disclosure, accelerator resources are not bound to virtual machines. Therefore, the resource use solution according to an embodiment of the present disclosure is more flexible in terms of resource sharing. Second, the resource use solution according to an embodiment of the present disclosure reduces the impact of accelerator device failures on jobs. Since accelerator resources are shared among all virtual machines and are globally deployed, available accelerator resources may be preferentially allocated to jobs of high importance. The impact of accelerator device failures on jobs of high importance may be greatly reduced. Third, the resource use solution according to an embodiment of the present disclosure allocates accelerator resources based on job types, so the solution may be customized according to system-specific job types. For example, in a storage system with deduplication applications, there are jobs of a plurality of job types and different importance, such as a recovery job, a backup job, and a garbage collection job. Available accelerator resources may be allocated based on requirements of different job types. For example, the weights used may be configured based on QoS requirements.

Figure 7:
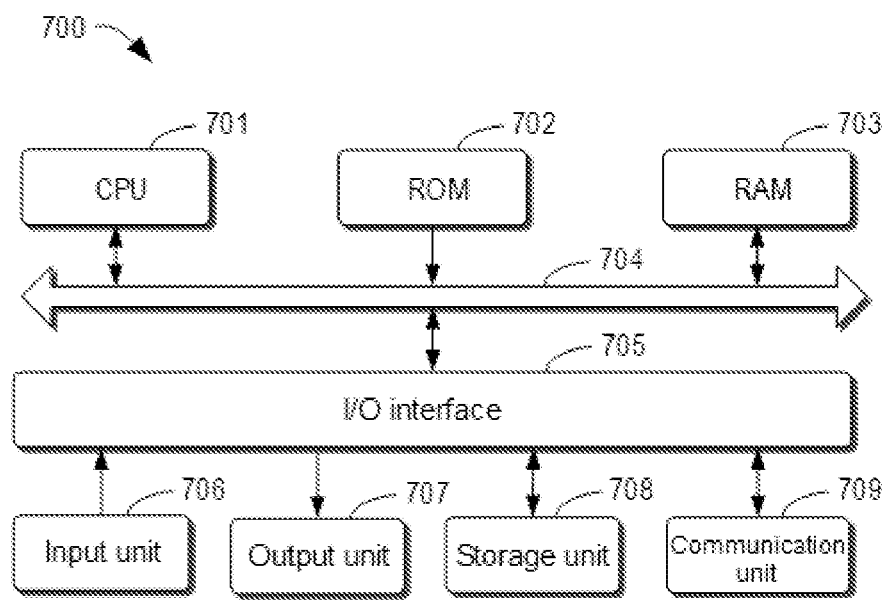
FIG. 7 illustrates a block diagram of an example device that may be configured to implement the embodiments of the present disclosure.

FIG. 7 illustrates a schematic block diagram of example device 700 that may be configured to implement the embodiments of the present disclosure. As shown in the figure, device 700 includes central processing unit (CPU) 701 that may perform various appropriate actions and processing according to computer program instructions stored in read-only memory (ROM) 702 or computer program instructions loaded from storage unit 708 to random access memory (RAM) 703. Various programs and data required for operations of device 700 may also be stored in RAM 703. CPU 701, ROM 702, and RAM 703 are connected to each other through bus 704. Input/output (I/O) interface 705 is also connected to bus 704.

A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices over a computer network such as the Internet and/or various telecommunication networks.

Processing unit 701 performs various methods and processing described above, such as method 400. For example, in some embodiments, method 400 may be implemented as a computer software program or computer program product, which is tangibly included in a machine-readable medium, such as storage unit 708. In some embodiments, part or all of the computer program may be loaded and/or installed onto device 700 via ROM 702 and/or communication unit 709. One or more steps of method 400 described above may be performed when the computer program is loaded into RAM 703 and executed by CPU 601. Alternatively, in other embodiments, CPU 701 may be configured to perform method 400 in any other suitable manner (e.g., by means of firmware).

According to some embodiments of the present disclosure, a computer-readable medium having a computer program stored thereon is provided, where the program, when executed by a processor, implements the method according to the present disclosure.

Those skilled in the art should understand that the steps of the above method of the present disclosure may be implemented by a general-purpose computing apparatus, and may be centralized on a single computing apparatus or distributed over a network composed of a plurality of computing apparatuses. Optionally, they may be implemented using program code executable by a computing apparatus, so that they may be stored in a storage apparatus and executed by a computing apparatus, or they may be made into integrated circuit modules respectively, or they may be implemented by making a plurality of modules or steps of them into a single integrated circuit module. Thus, the present disclosure is not limited to any particular combination of hardware and software.

It should be understood that although some apparatuses or sub-apparatuses of the device are mentioned in the above detailed description, such division is merely illustrative rather than mandatory. In fact, the features and functions of two or more apparatuses described above may be embodied in one apparatus according to the embodiments of the present disclosure. On the contrary, the features and functions of one apparatus described above can be embodied by further dividing the apparatus into a plurality of apparatuses.

The above description is only optional embodiments of the present disclosure, and is not intended to limit the present disclosure. For those skilled in the art, the present disclosure may take on various modifications and alterations. Any modification, equivalent replacement, improvement, and the like made within the spirit and principle of the present disclosure should be encompassed in the scope of protection of the present disclosure.

The invention claimed is:

1. A resource usage method, comprising:
   determining a plurality of jobs requesting to use accelerator resources to accelerate data processing, the plurality of jobs being initiated by at least one virtual machine;
   allocating available accelerator resources to the plurality of jobs based on job types of the plurality of jobs, including in response to the plurality of jobs having a plurality of job types, determining corresponding proportions of the available accelerator resources allocated to the plurality of job types, and allocating the available accelerator resources to the plurality of jobs according to the determined proportions, wherein determining the corresponding proportions of the available accelerator resources includes determining a weight of each job type and a number of jobs of each job type among the plurality of jobs, and determining a proportion of the available accelerator resources allocated to each job type based on the weight of each job type and the number of jobs of each job type; and causing the plurality of jobs to be executed using the allocated accelerator resources.

2. The method according to claim 1, further comprising:
monitoring the execution performance of jobs of at least one job type among the plurality of job types;
increasing, if it is determined that the execution performance does not meet performance requirements, the weight of the at least one job type; and
updating the proportion of the available accelerator resources allocated to each job type based on the increased weight and the number.

3. The method according to claim 1, wherein the plurality of job types comprise at least two of the following: a job type for data backup, a job type for data recovery, a job type for data copy, and a job type for garbage collection, and
the weight of any one of the job type for data backup and the job type for data recovery is higher than the weight of any one of the job type for data copy and the job type for garbage collection.

4. The method according to claim 1, wherein allocating the available accelerator resources to the plurality of jobs comprises:
allocating, if it is determined that the plurality of jobs have the same job type, the available accelerator resources to the plurality of jobs.

5. The method according to claim 1, further comprising:
selecting, from a resource pool comprising a plurality of accelerator devices, failure-free accelerator devices as the available accelerator resources.

6. The method according to claim 1, wherein determining the plurality of jobs comprises:
determining, in response to a plurality of requests for the plurality of jobs being generated at the at least one virtual machine, the plurality of jobs based on the plurality of requests, each request indicating a job type of a corresponding job among the plurality of jobs and comprising data to be processed.

7. The method according to claim 1, wherein the accelerator resources are one or more quick assist technology (QAT) cards.

8. An electronic device, comprising:
a processor; and
a non-transitory memory coupled to the processor and having instructions stored therein, which when executed by the processor, cause the processor to perform actions comprising:
determining a plurality of jobs requesting to use accelerator resources to accelerate data processing, the plurality of jobs being initiated by at least one virtual machine;
allocating available accelerator resources to the plurality of jobs based on job types of the plurality of jobs, including in response to the plurality of jobs having a plurality of job types, determining corresponding proportions of the available accelerator resources allocated to the plurality of job types, and allocating the available accelerator resources to the plurality of jobs according to the determined proportions, wherein determining the corresponding proportions of the available accelerator resources includes determining a weight of each job type and a number of jobs of each job type among the plurality of jobs, and determining a proportion of the available accelerator resources allocated to each job type based on the weight of each job type and the number of jobs of each job type; and causing the plurality of jobs to be executed using the allocated accelerator resources.

9. The device according to claim 8, wherein the actions further comprise:
monitoring the execution performance of jobs of at least one job type among the plurality of job types;
increasing, if it is determined that the execution performance does not meet performance requirements, the weight of the at least one job type; and
updating the proportion of the available accelerator resources allocated to each job type based on the increased weight and the number.

10. The device according to claim 8, wherein the plurality of job types comprise at least two of the following: a job type for data backup, a job type for data recovery, a job type for data copy, and a job type for garbage collection, and
the weight of any one of the job type for data backup and the job type for data recovery is higher than the weight of any one of the job type for data copy and the job type for garbage collection.

11. The device according to claim 8, wherein allocating the available accelerator resources to the plurality of jobs comprises:
allocating, if it is determined that the plurality of jobs have the same job type, the available accelerator resources to the plurality of jobs.

12. The device according to claim 8, wherein the actions further comprise:
selecting, from a resource pool comprising a plurality of accelerator devices, failure-free accelerator devices as the available accelerator resources.

13. The device according to claim 8, wherein determining the plurality of jobs comprises:
determining, in response to a plurality of requests for the plurality of jobs being generated at the at least one virtual machine, the plurality of jobs based on the plurality of requests, each request indicating a job type of a corresponding job among the plurality of jobs and comprising data to be processed.

14. The device according to claim 8, wherein the accelerator resources are one or more quick assist technology (QAT) cards.

15. A computer program product tangibly stored in a non-transitory computer-readable medium and comprising machine-executable instructions, which when executed, cause a machine to perform actions, the actions comprising:
determining a plurality of jobs requesting to use accelerator resources to accelerate data processing, the plurality of jobs being initiated by at least one virtual machine;
allocating available accelerator resources to the plurality of jobs based on job types of the plurality of jobs, including in response to the plurality of jobs having a plurality of job types, determining corresponding proportions of the available accelerator resources allocated to the plurality of job types, and allocating the available accelerator resources to the plurality of jobs according to the determined proportions, wherein determining the corresponding proportions of the available accelerator resources includes determining a weight of each job type and a number of jobs of each job type among the plurality of jobs, and determining a proportion of the available accelerator resources allocated to each job type based on the weight of each job type and the number of jobs of each job type; and causing the plurality of jobs to be executed using the allocated accelerator resources.

* * * * *